United States Patent [19]
Zanoni

[11] B 3,984,153

[45] Oct. 5, 1976

[54] APPARATUS TO TRANSFORM A SINGLE LASER BEAM INTO TWO PARALLEL BEAMS OF ADJUSTABLE SPACING AND INTENSITY

[75] Inventor: Carl A. Zanoni, Middletown, Conn.

[73] Assignee: Zygo Corporation, Middlefield, Conn.

[22] Filed: May 15, 1974

[21] Appl. No.: 469,947

[44] Published under the second Trial Voluntary Protest Program on January 20, 1976 as document No. B 469,947.

[52] U.S. Cl. .............................. 350/173; 350/152
[51] Int. Cl.² .................. G02B 27/10; G02B 27/28
[58] Field of Search ....... 350/171, 173, 152, DIG. 2

[56] References Cited
UNITED STATES PATENTS

| | | | |
|---|---|---|---|
| 1,505,877 | 8/1924 | Eppenstein | 356/16 |
| 3,817,624 | 6/1974 | Martin | 350/173 X |

OTHER PUBLICATIONS

Hoffman, Article in IBM Technical Disclosure Bulletin, vol. 8, No. 11, Apr., 1966, p. 1554.

Primary Examiner—David H. Rubin

[57] ABSTRACT

An optomechanical apparatus is described which transforms a single laser beam into two parallel beams of adjustable spacing and intensity. The distance between the two output beams can be varied continuously over a wide range, and the distance between the output beams can be reduced to zero. By splitting a polarized laser beam into two beams of orthogonal polarization with a polarization beam splitter, by redirecting the reflected beam with a stationary roof prism, a stationary pentaprism, and a moveable pentaprism such that the reflected beam is rereflected by the opposite side of the polarization beam splitter, two beams of variable intensity and of nominal parallelism are produced. A suitably placed pair of counterrotating wedges permits alignment of the beams to a high degree of parallelism.

2 Claims, 3 Drawing Figures

APPARATUS TO TRANSFORM A SINGLE LASER BEAM INTO TWO PARALLEL BEAMS OF ADJUSTABLE SPACING AND INTENSITY

BACKGROUND OF THE INVENTION

1. Field of the Invention

The present invention relates to apparatus for transforming a single laser beam into two parallel beams of adjustable spacing and intensity. The distance between the two output beams can be varied continuously over a wide range, and the distance between the output beams can be reduced to zero. Specifically, the invention relates to optical apparatus which is useful in a variety of optical measuring devices which perform rapid and accurate noncontacting measurement of object dimensions, hole dimensions, object positions, and sheet thickness.

2. The Prior Art

For the accurate measurement of the diameter, position, or thickness of soft, delicate, hot, or moving objects, noncontacting sensors must be used. Prior-art devices of this character include capacitive gauges, eddy-current gauges, air gauges, gamma- and x-ray gauges, and optical sensors. Only the optical and nuclear gauges can work at distances greater than a small fraction of an inch with sufficient sensitivity. The nuclear gauges permit large working distances; however, they are extremely expensive and susceptible to systematic errors due to slight variations in the chemical composition of the object being measured.

Optical sensors have advantages due to the nature of light itself. The principal advantages are:

1. They do not require direct mechanical contact between the sensor and the object to be measured.
2. The distance from the sensor to the object to be measured can be large.
3. The response time is limited to that of the photodetector and its electronics.
4. Light variations are directly convertible to electrical signals; and
5. The measurements are independent of the chemical composition of the object.

In such apparatus, it is desirable to produce two parallel light beams with a parallelism tolerance of several seconds of arc in the plane of the measurement.

For example, U. S. Pat. No. 2,812,685 discloses apparatus for the dimensional measurement of moving objects wherein two parallel light beams of variable spacing are used. There are two important disadvantages in the means disclosed for producing the two light beams. Firstly, the distance between the beams cannot be made less than the beam diameter, since the fixed halfsilvered mirror used to produce one beam begins to obscure the beam from the adjustable mirror used to produce the second beam for distances less than the beam diameter. Secondly, in order to preserve the parallelism of the two output beams, the angular alignment of the adjustable mirror must be maintained to very high degree when the beam spacing is varied. Furthermore, a slight tilt of either the adjustable mirror or the half-silvered mirror originating from any cause introduces adverse measurement errors. The tilts can arise from mechanical changes or from thermally induced mechanical changes.

While prior-art techniques for producing two parallel light beams of adjustable spacing are useful for some applications, they cannot be used for the accurate control of many industrial operations. For example, in the high-speed extrusion of aluminum rod, it is desirable to get readings with accuracies of 0.0001 inch. The extruded rod moves in every direction as it comes out of the die so that the sensor must be capable of fast, accurate measurements over a large measurement volume, i.e., several inches on a side, and with a short measurement duration. The measurement of sheet thickness in a rolling mill is an example where a high sensitivity sheet thickness sensor with a large working distance, large measurement range, and short measurement duration is required.

OBJECTS OF THE INVENTION

This invention aims to provide an improved apparatus for transforming a single laser beam into two parallel beams of adjustable spacing and intensity. This apparatus has broad utility in optical devices used to measure object diameters, sheet thickness, and object positions in a noncontacting manner.

Other objects of the invention will be apparent from the following description taken in connection with the accompanying drawings.

STATEMENT OF THE INVENTION

In accordance with the present invention, I provide a source of radiant energy which produces a beam, most preferably a gas laser which produces a narrow collimated linearly-polarized beam of light, and I direct said beam onto (a) a beam splitter, preferably a polarization beam splitter which permits a portion of said light to pass through as a first output beam, and reflects a second portion of said beam onto (b) means, most preferably a roof prism, which offsets and reflects the second portion of the beam in a constant deviation fashion onto (c) means, preferably a fixed pentaprism, which reflects the second portion of the beam in a constant deviation fashion by 90° onto (d) moveable means, most preferably a moveable pentaprism, positioned to reflect the second portion of the beam, in a constant deviation fashion, back through the beam splitter as a second output beam which is approximately parallel to the first output beam, and (e) means, most preferably counterrotating wedges, in the path of the second portion of the beam ahead of the moveable means, which can be adjusted to ensure that the second output beam is truly parallel to the first output beam, thereby producing two parallel output beams which can be offset from each other as desired by moving the moveable means.

THE DRAWINGS

DETAILED DESCRIPTION OF THE INVENTION

Description and Explanation of the Drawings

While the technique has application for a wide range of radiation sources, the following description is taken by way of example with respect to an optical system. The term "radiant energy" as used herein includes, but is not limited to, electromagnetic energy of all frequency ranges.

Figure 1:
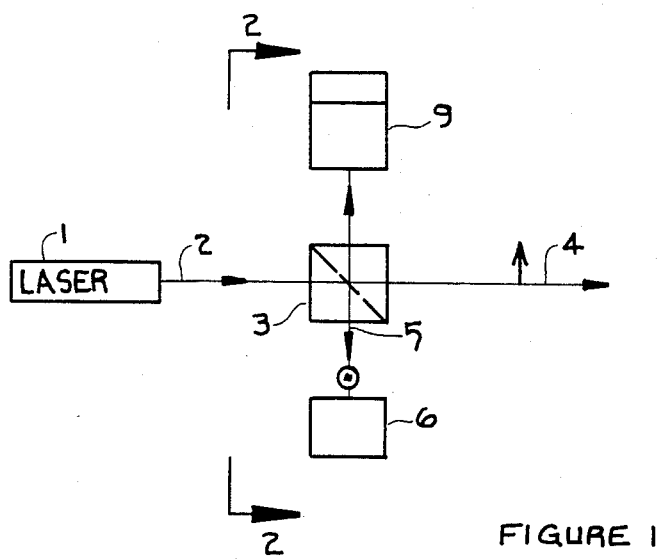
FIG. 1 is a schematic diagram showing a top view of the apparatus used to produce two parallel beams of adjustable spacing and intensity from a single laser beam.

Referring to FIG. 1, a light source such as a tungsten bulb, xenon bulb, light-emitting diode, laser diode, or other source of radiant energy, and most preferably a gas laser 1, provides optical energy for a narrow, nearly collimated, linearlypolarized beam 2. Polarization beam splitter 3 divides the incident input beam 2 into two orthogonal beams 4 and 5. A polarization beam splitter divides an input beam into two beams which have orthogonal polarization states. The $p$ component of the input beam 2 is transmitted as an output beam 4, and the $s$ component of the input beam 2 is reflected as beam 5. The dashed line denotes the beam splitter surface. The angular orientation of the polarization vector of beam 2 determines the relative intensity of beams 4 and 5. Rotating the polarization of beam 2 relative to the plane of incidence on the beam splitter surface either by rotating the laser about an axis coincident with the laser beam 2 or rotating a half-wave phase retardation plate placed in the laser beam 2 permits the adjustment of the relative intensity of beams 4 and 5. Either can be adjusted from zero to the full laser beam intensity continuously and easily. Normally, the beams 4 and 5 are adjusted so that the two output beams of the apparatus have nearly equal intensity. Beam 4 is linearly polarized in the $p$ state (indicated by ↑ in the drawings), and beam 5 is linearly polarized in the $s$ state (indicated by ⊙ in the drawings).

Figure 2:
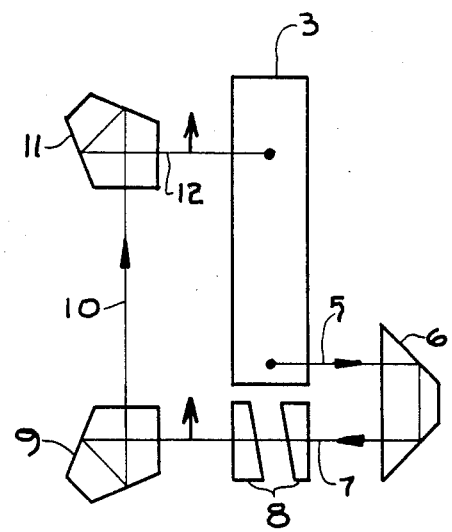
FIG. 2 is a sectional side view of the apparatus, through the line 2—2 of FIG. 1.

The reflected beam 5 goes into a roof prism 6 which is a one-dimensional retroreflector; the roof prism 6 serves to produce a light beam which is offset and parallel to beam 5. The output beam 7 of the roof prism (FIG. 2) is passed under the beam splitter 3.

Beam 7 passes through two counterrotating wedges 8. The counterrotating wedges provide a means to adjust the angle of the eventual output beam 13 relative to the transmitted beam 4. By incorporating these wedges 8, the angle tolerances of the components can be considerably relaxed. Moreover, the angular adjustment applies for all beam separations.

Figure 3:
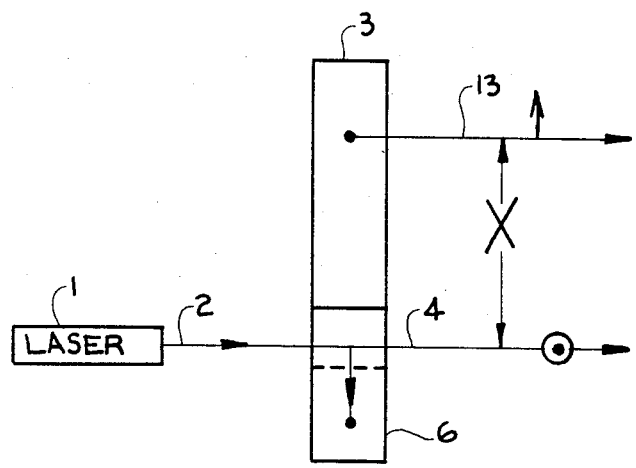
FIG. 3 is a sectional side view orthogonal to that shown in FIG. 2.

After passing through the angle adjustment elements 8, the beam is deviated 90° by the stationary pentaprism 9, to produce a beam 10, which is then deviated again by 90° by a second, moveable pentaprism 11. The output beam 12 of the moveable pentaprism 11 is then reflected from the beam splitter surface to produce a final output beam 13 parallel to, but offset from, the transmitted beam 4, as shown in FIG. 3.

The counterrotating wedges 8 can be placed anywhere in the path of the reflected beam 5 in advance of the moveable pentaprism 11.

A most important feature of the present invention is the insensitivity to spurious tilts of various elements. In particular, the angle of transmitted beam 4 is independent to first order of the variation in angular orientation in the beam splitter 3. Since the roof prism 6 and the pentaprisms 9 and 11 are constant deviation elements, variations in their angular orientation have no effect on the angle of the reflected beam 12. Furthermore, since the reflected final output beam 13, FIG. 3, experiences two reflections from the opposite sides of the beam splitter surface, the angular orientation of the second output beam 13 is independent of the angular orientation of beam splitter 3.

In addition, because the moveable pentaprism 11 can be moved conveniently over the entire length of beam splitter 3, the spacing between the two output beams can be made zero. In fact, the beams can be made to cross over each other with no difficulty, if desired. The output beams have orthogonal linear polarization; hence it is meaningful to label the distance between them as a signed quantity.

As shown in FIG. 3, X denotes the spacing between the two parallel output beams 13 and 4. X can range from 0 to the length of the beam splitter 3, or X can range from 0 to ± half the length of the beam splitter 3. The arrow on the beam 13 represents that its polarization vector is in the plane of the figure; the 0 on beam 4 represents the fact that the polarization vector is orthogonal to the plane of the figure.

Obviously, the specific device shown can be altered without departing from the scope of the invention which is defined in the claims.

I claim:

1. A device for converting a beam of collimated light into two parallel beams comprising (a) a beam splitter which permits a first portion of said beam to pass through as a first output beam, and reflects a second portion of said beam onto (b) a roof prism to one side of said beam splitter for offsetting and reflecting said second portion of said beam, in a constant deviation fashion, clear of and to the other side of said beam splitter onto (c) a fixed pentaprism for reflecting said second portion of said beam, in a constant deviation fashion, by 90° onto (d) a moveable pentaprism positioned to reflect, in a constant deviation fashion, by 90°, said second portion of said beam onto said other side of said beam splitter to produce a second output beam in approximate parallelism with said first output beam, whereby the distance between said two output beams can be adjusted from coincidence to substantially the full length of said beam splitter by moving the moveable pentaprism toward or away from the fixed pentaprism, and (e) counter rotating wedges, in the path of said second portion of said beam in advance of said moveable pentaprism, adjustable to ensure effective parallelism between said two output beams.

2. The device of claim 1, in which the source of radiant energy is a gas laser which produces a linearly-polarized narrow beam of collimated light, and the beam splitter is a polarization beam splitter which splits the light into two beams, orthogonally polarized to each other.

* * * * *